(12) United States Patent
Sethuramalingam et al.

(10) Patent No.: US 9,792,141 B1
(45) Date of Patent: Oct. 17, 2017

(54) CONFIGURED GENERATION OF VIRTUAL MACHINE IMAGES

(71) Applicant: Amazon Technologies, Inc., Seattle, WA (US)

(72) Inventors: Ekanth Sethuramalingam, Milpitas, CA (US); Raviprasad Venkatesha Murthy Mummidi, Mountain View, CA (US); Derek Avery Lyon, San Francisco, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 162 days.

(21) Appl. No.: 14/788,221

(22) Filed: Jun. 30, 2015

Related U.S. Application Data

(60) Provisional application No. 62/167,819, filed on May 28, 2015.

(51) Int. Cl.
G06F 9/455 (2006.01)

(52) U.S. Cl.
CPC .. *G06F 9/45558* (2013.01); *G06F 2009/4557* (2013.01); *G06F 2009/45595* (2013.01)

(58) Field of Classification Search
None
See application file for complete search history.

(56) References Cited

U.S. PATENT DOCUMENTS

| 8,938,611 | B1* | 1/2015 | Zhu | H04L 49/70 713/153 |
| 9,043,786 | B1* | 5/2015 | Hodge | G06F 9/45558 717/171 |
| 9,128,742 | B1* | 9/2015 | Akolkar | G06F 9/45558 |
| 2010/0153945 | A1* | 6/2010 | Bansal | G06F 9/4881 718/1 |
| 2010/0211829 | A1* | 8/2010 | Ziskind | G06F 11/0757 714/48 |

(Continued)

OTHER PUBLICATIONS

"List of build automation software," retrieved on May 14, 2015, from http://en.wikipedia.org/wiki/List_of_build_automation_software, 5 pages.

(Continued)

*Primary Examiner* — Adam Lee
(74) *Attorney, Agent, or Firm* — Seed IP Law Group LLP

(57) ABSTRACT

Techniques are described for generating and using virtual machine images and other software images in configured manners, such as by an image generating service on behalf of clients. An image may be configured to include or use multiple underlying components to construct the image, and specified configuration information may cause the generating process for the image to be triggered when underlying construction components change or otherwise when specified triggering conditions are satisfied. For example, an image to be manufactured may include a software program under development by a software developer client, with code files used to create the software program being among the construction components, such that client actions involving those code files (e.g., committing a new version with recent changes to a code repository) triggers a new version of the image to be manufactured that incorporates those changes.

19 Claims, 9 Drawing Sheets

(56) References Cited

U.S. PATENT DOCUMENTS

| | | | | |
|---|---|---|---|---|
| 2010/0313200 | A1* | 12/2010 | Rozee | G06F 8/61 718/1 |
| 2012/0144391 | A1* | 6/2012 | Ueda | G06F 9/45558 718/1 |
| 2012/0324446 | A1* | 12/2012 | Fries | G06F 21/64 718/1 |
| 2013/0104125 | A1* | 4/2013 | Sarma | G06F 21/10 718/1 |
| 2013/0212709 | A1* | 8/2013 | Tucker | G06F 21/55 726/29 |
| 2013/0263209 | A1* | 10/2013 | Panuganty | H04L 43/04 726/1 |
| 2013/0332901 | A1* | 12/2013 | Berg | G06F 8/71 717/121 |
| 2014/0137230 | A1* | 5/2014 | Benari | G06F 21/44 726/12 |
| 2015/0277886 | A1* | 10/2015 | Bronheim | G06F 9/45533 717/174 |
| 2016/0019085 | A1* | 1/2016 | Khandekar | G06F 9/45558 718/1 |

OTHER PUBLICATIONS

"Make (Software)," retrieved on May 14, 2015, from http://en.wikipedia.org/wiki/Make_(software), 8 pages.

* cited by examiner

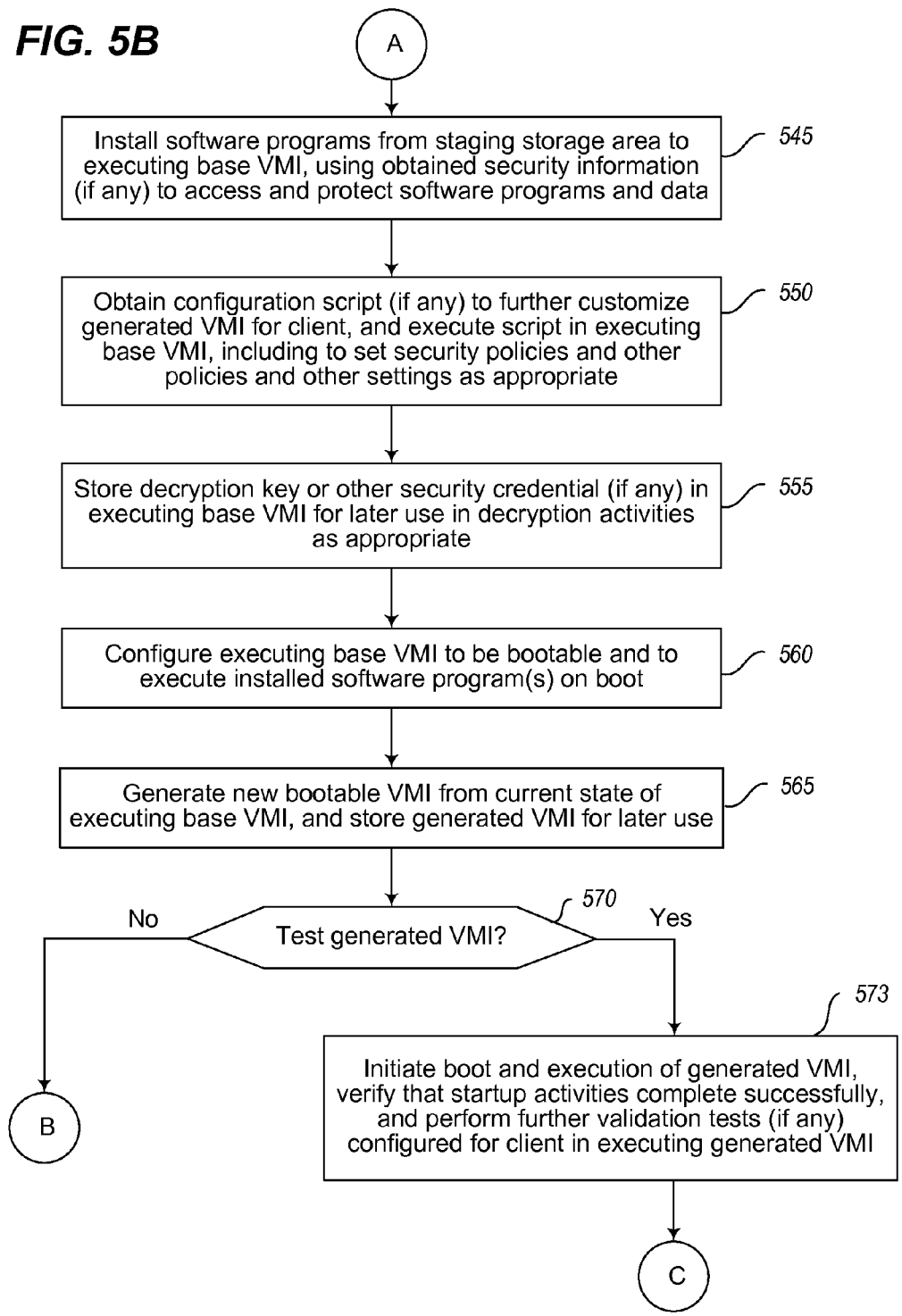

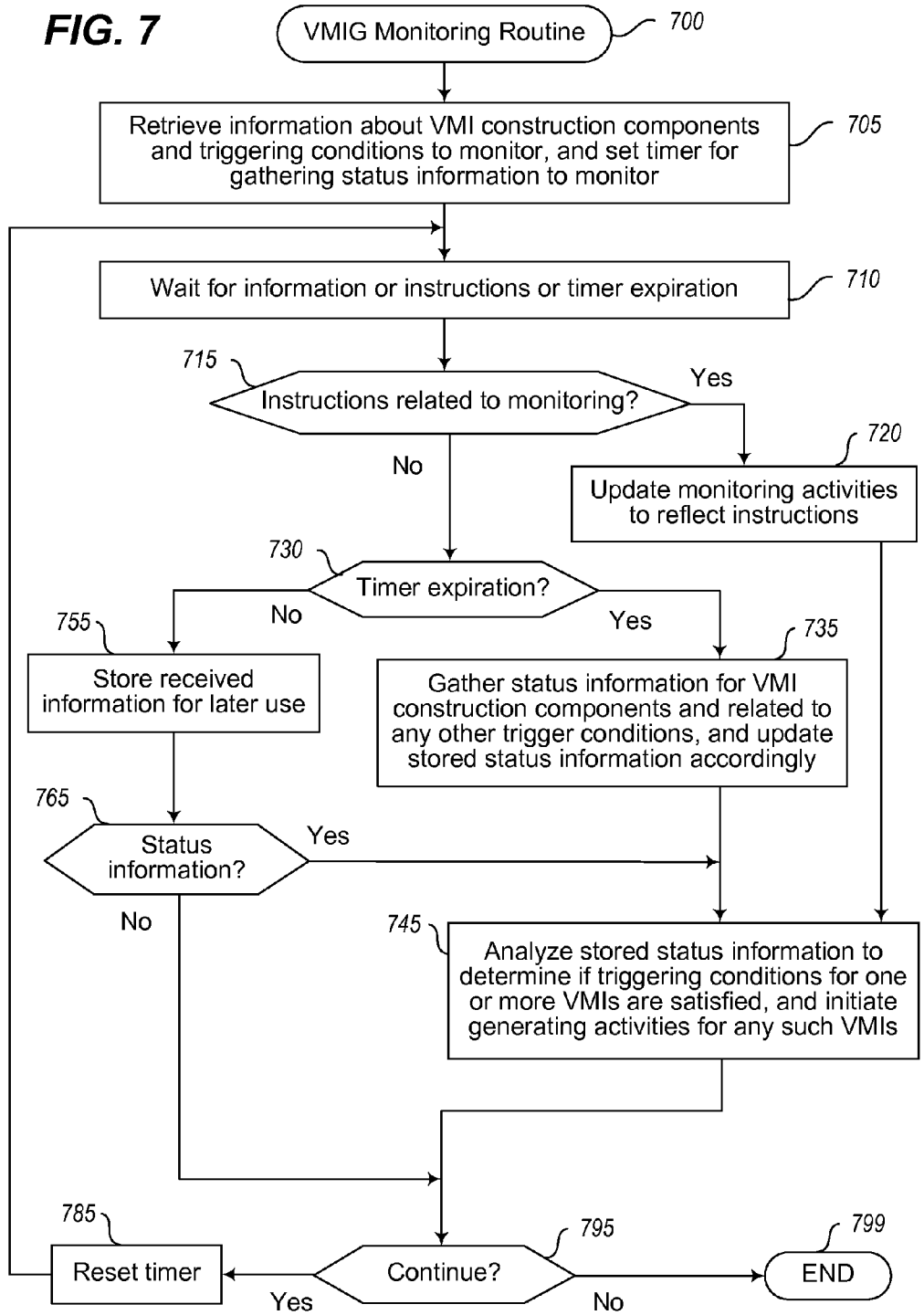

US 9,792,141 B1

CONFIGURED GENERATION OF VIRTUAL MACHINE IMAGES

BACKGROUND

The advent of virtualization technologies for commodity hardware has provided benefits for many customers with diverse needs, allowing various computing resources to be efficiently and securely shared between multiple customers. For example, virtualization environments such as those provided by VMWare, XEN, Hyper-V and User-Mode Linux may allow a single physical computing machine to be shared among multiple users by providing each user with one or more virtual machines hosted by the single physical computing machine. Each such hosted virtual machine may be a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that actually spans multiple distinct physical computing systems.

However, difficulties exist with the use of virtualization technologies, including with respect to creating virtual machine images that execute within virtual machines.

BRIEF DESCRIPTION OF THE DRAWINGS

FIGS. 5A-5C illustrate a flow diagram of an example embodiment of a VMIG Construction routine.

FIG. 7 illustrates a flow diagram of an example embodiment of a VMIG Monitoring routine.

DETAILED DESCRIPTION

Figure 1:
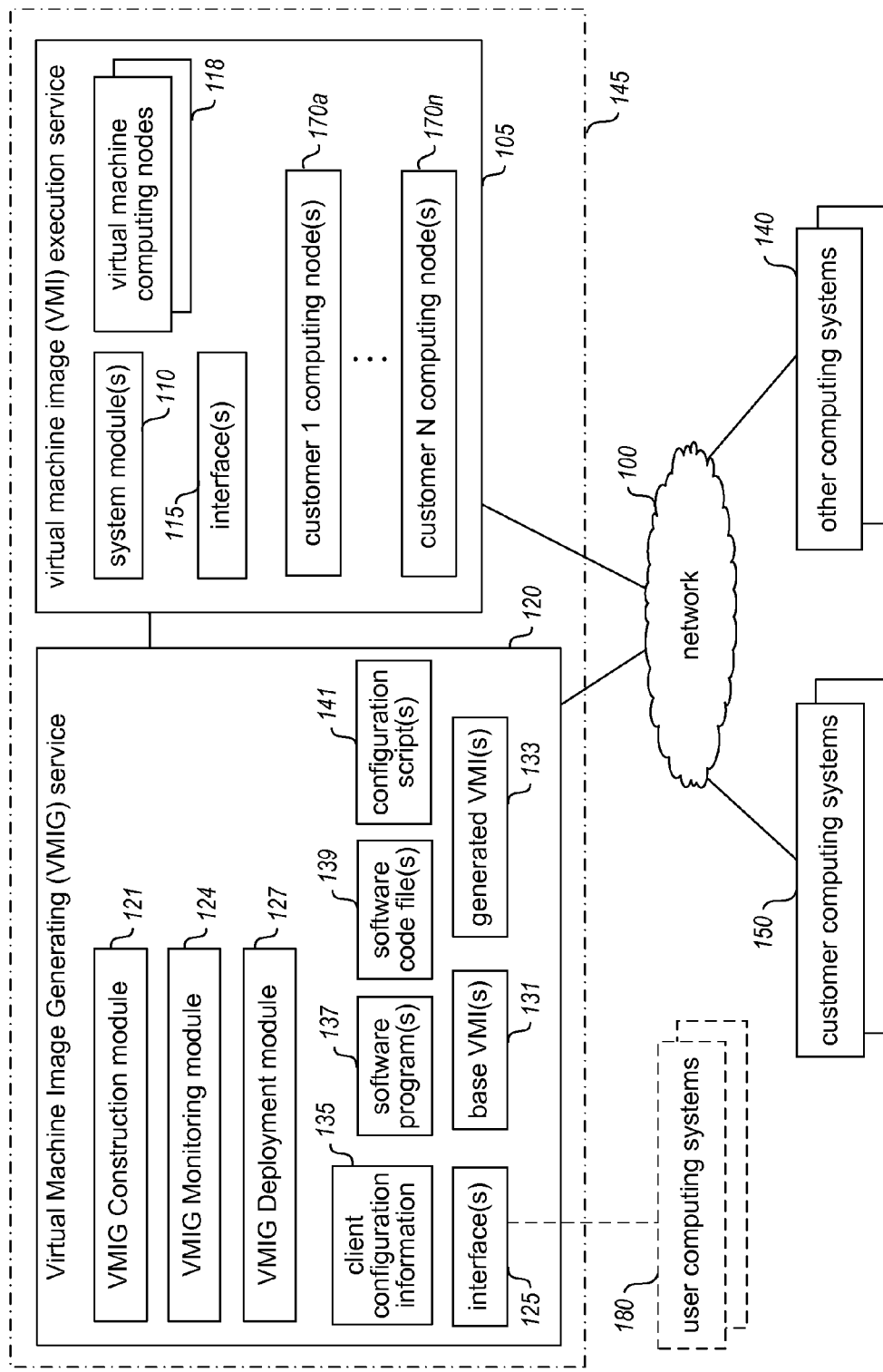
FIG. 1 is a network diagram illustrating an example environment in which a service may be used for generating virtual machine images in configured manners.

Techniques are described for generating and using virtual machine images and other software images in configured manners, such as by an image generating service on behalf of clients of the image generating service. In at least some embodiments, an image to be manufactured for a client is configured to include or use multiple underlying components to construct the image, and configuration information specified for the image may cause the generating process for the image to be triggered when one or more of the underlying construction components changes. As one non-exclusive example, an image to be manufactured may include one or more software programs under development by a software developer client (whether an individual or a group), with code files or other groups of instructions used to create those software program(s) being among the construction components for that image, such that client actions involving those code files or other instruction groups (e.g., committing a new version with recent changes to a code repository) triggers a new version of the image to be manufactured that incorporates those changes. More generally, the configuration specified for an image may include one or more triggering conditions that, when satisfied by current status information, cause the generating process for the image to be initiated. At least some of the described techniques are performed in at least some embodiments by an automated image generating service, such as an exemplary Virtual Machine Image Generating (VMIG) service, as described in greater detail below.

In at least some embodiments, the executable software images being manufactured are virtual machine images (e.g., images that are bootable or otherwise loadable by a hosted virtual machine in a particular virtualization environment, and that each include operating system software and optionally software for one or more application programs, as well as optionally including one or more hard disks or other representations of stored data, including data specific to a particular client, and optionally with particular software to be automatically executed upon booting or other startup of the image). While some of the document herein discusses virtual machine images for the purpose of illustration and specificity, it will be appreciated that the described techniques may be used with other types of software images in some embodiments and situations, including software images that are executable in host environments that are not hosted virtual machines—such other types of software images may similarly be bootable and include operating system software and/or software for one or more application programs, optionally along with various types of stored data, and optionally with particular software to be automatically executed upon booting or other startup of the image.

As noted above, a virtual machine image to be manufactured may be configured to include or use multiple underlying construction components as part of generating the virtual machine image. Such underlying construction components of a virtual machine image for a client may include, for example, some or all of the following: a base virtual machine image to be loaded and modified to create the virtual machine image being generated (e.g., a virtual machine image that includes a particular operating system but does not include client-specific software and/or data and/or settings); operating system components or modules (e.g., if not included in the base image); one or more existing software programs (e.g., commercially available software programs or other pre-existing software programs); one or more software programs being developed by the client, such as may be represented by code files or other groups of instructions to compile and/or otherwise combine to produce the software program(s); one or more configuration scripts or other sets of executable that when executed set or modify policies or other settings (e.g., to set user permissions and other access controls, to specify firewall policies and other security-related and/or access policies, etc.); one or more build scripts or other sets of instructions or information that specify information about how creation and/or configuration of the virtual machine image is to be performed, including to optionally specify some or all of the other construction components for the virtual machine image; groups of content or other data to be stored and included in the virtual machine image; etc. In addition, in some embodiments and situations, each of the underlying construction components to use in generating a virtual machine image for a client may be supplied by the client, while in other embodiments and situations, some or all of the underlying construction components may be supplied by the VMIG service (e.g., if the client selects from a plurality of predefined available construction components of one or more types, such as base images, software programs, configuration scripts, etc.). In addition to such underlying construction components, a client of the VMIG service may further specify one or more triggering conditions for use in determining when to initiate the generating process for a generated VMI, as discussed in greater detail below, while in other embodiments the VMIG service may implement at least one triggering condition for some or all generated VMIs (e.g., if at least one of the underlying construction components changes).

The VMIG service may also be implemented in various environments in various embodiments. As one example, the VMIG service may be implemented by or on behalf of one or more particular clients in some embodiments, such as by a company or other organization on behalf of its employees or other organization members—in such embodiments, the clients of the VMIG service may be users who are software developers for the company or other organization, and the VMIG service may be useful in generating virtual machine images for internal use within the organization or for use by the organization in processing data on behalf of customers of the organization. As another example, the VMIG service may be implemented as part of an online service that is accessible to external customers (e.g., as a fee-based service) in some embodiments. Such external customers may, for example, use client devices to interact with the online service from remote locations, such as by sending electronic communications over one or more intervening computer networks (e.g., the Internet, cellular telephone networks and other telecommunications networks, etc.) separating the client devices and the online service.

In addition, the VMIG service may implement and provide one or more interfaces for use by customers or other users who are clients of the VMIG service, such as one or more GUIs ("graphical user interfaces") via which clients may specify and configure particular types of operations to be performed and may obtain results of such operations, and/or one or more defined APIs ("application programming interfaces") or other programmatic interfaces via which executing programs on the clients' computing devices may exchange electronic communications of defined types. Such service-provided interfaces may enable clients to perform any of the types of activities described herein, such as to register with the VMIG service, to request that a generating process for a particular VMI be created and to configure such a generating process (including to specify construction components to use, triggering conditions to use, and/or other types of configuration information), to upload construction components or other data to the VMIG service for subsequent use in a generating process, to specify an external accessible location of construction components or other data for subsequent use in a generating process, to request that the generating process for a generated VMI be initiated at a current or other indicated time, to obtain copies of VMIs generated by the VMIG service for the client or to otherwise obtain access to such VMIs, to monitor operations of the VMIG service (e.g., operations performed for the client), etc.

The VMIG service may further be configured to perform additional automated operations for some or all generated VMIs that it manufactures in at least some embodiments and situations. As one example, the VMIG service may be configured to execute or otherwise deploy a generated VMI of a client on behalf of the client, or to otherwise provide the client with access to a copy of the generated VMI. In some embodiments, the VMIG service may be part of an online image execution service or may otherwise be affiliated with or in communication with one or more such online image execution services, and if so the VMIG service may be configured to perform automated operations to cause a generated VMI that is manufactured to be executed in such an online image execution service (e.g., in exchanges for fees that the client pays to the online image execution service as a customer of the online image execution service)—such automated operations may include providing a copy of a generated VMI for a client to the online image execution service along with instructions to execute that generated VMI on behalf of that client. In other embodiments and situations, the VMIG service may provide its own computing machines to execute at least some of the generated VMIs on behalf of clients, such as for testing purposes and/or for ongoing use by the clients.

Additional automated operations that the VMIG service may be configured to perform for some or all generated VMIs that it manufactures may include testing and other validation of such generated VMIs in at least some embodiments and situations. Such validation may include using computing machines that the VMIG service provides for such use and/or interacting with one or more online image execution services to perform such validation. The validation to perform for a particular generated VMI of a client may be configurable by the client in at least some embodiments and situations, while in other embodiments all generated VMIs or no generated VMIs may receive such validation. As one example, some or all generated VMIs may be tested by initiating a boot or other startup of the generated VMI to determine if that process succeeds (assuming that the generated VMI is a bootable image), including to verify that any software programs of the generated VMI that are configured to execute on boot have their execution occur without error. In addition, a client may specify one or more validation tests to perform on a particular generated VMI of the client (e.g., as selected from a plurality of validation tests provided by the VMIG service, as specified and supplied by the client, etc.), such as to run one or more validation scripts on the generated VMI that check for particular responses or settings. Results of any such validation operations may be used in various manners, including to provide them to the client (e.g., via a provided interface of the VMIG service), to generate an error message or condition for a generated VMI that fails one or more validation tests, to initiate corrective or replacement activities for a generated VMI that fails one or more validation tests, etc.

The VMIG service may further perform additional automated operations to determine when to initiate the generating process for a particular generated VMI, such as to schedule the process to occur at a specified time, and/or to perform monitoring activities with respect to one or more triggering conditions specified for the generated VMI. In some embodiments and situations, the monitoring activities with respect to a generated VMI may include determining whether any changes (or any changes of a specified type) occur for any construction components of the generated VMI or for specified construction components of the generated VMI, whether construction components stored at the VMIG service and/or accessible at one or more specified external locations (e.g., a storage location controlled by the client, storage of another online service, etc.). Various types of status information may be accessible to the VMIG service, and if so, the VMIG service may allow triggering conditions to be specified with respect to any such status information in at least some embodiments. The VMIG service may further be configured to obtain such status information in various manners, such as periodically, in a substantially continuous manner, by having particular information pushed to the VMIG service by one or more external sources and/or pulled by the VMIG service from such external sources, etc.

Use of the described techniques may provide various types of benefits, including to provide a more efficient and reliable and consistent mechanism for generating and deploying virtual machine images and other software images, to assist software developers in creating and testing software under development, to assist companies and other organizations in generating images for internal use within the organization or for use by the organization in processing data on behalf of customers of the organization, to assist external customers of an online service in generating images (e.g., if the customers lack capabilities to do so on their own), to assist an affiliated image execution service in obtaining images to execute for customers of the image execution service, etc.

For illustrative purposes, some embodiments are described below in which specific types of software images, construction components, image generating operations, image validation operations and image deployment operations are performed, including with respect to using such techniques with an online service that provides functionality to manufacture virtual machine images in configured manners on behalf of customers, and/or to using such techniques on behalf of an affiliated image execution service. These examples are provided for illustrative purposes and are simplified for the sake of brevity, and the inventive techniques may be used in a wide variety of other situations, including in other environments and with respect to other types of software images to manufacture, some of which are discussed below.

FIG. 1 is a network diagram illustrating an example of an online network-accessible Virtual Machine Image Generating (VMIG) service that provides clients with client-configurable functionality for generating of virtual machine images (VMIs). After such a VMI is manufactured for a client by the VMIG service, the client may further obtain access to the VMI in various manners, such as to obtain a copy for execution on hosted virtual machines under control of the client, to have an online virtual machine image execution service execute the VMI for the client, etc. FIG. 1 further illustrates an example of such a virtual machine image execution service 105 that provides and manages virtual machine computing nodes available for use in providing execution capacity to execute virtual machine images for multiple customers. In the illustrated embodiment, the virtual machine image (VMI) execution service 105 and the VMIG service 120 may be integrated together into a single network-accessible service 145, such as if both are operated by the same operator entity, but in other embodiments may have other forms (e.g., being separate systems operated by separate entities, being in the form of a single system that includes at least some of the described functionality of both the VMI execution service and the VMIG service, having only the VMIG service without any VMI execution service, etc.).

In the example of FIG. 1, various customer users (not shown) are using various client computing systems 150 to interact over a public network 100 with one or both of the online VMIG service and the online VMI execution service, such as for some such customers to interact with only one of the two services, while other such customers may interact with both of the services. In other embodiments, the VMIG service may operate on behalf of a particular group of one or more users who use user computing systems 180 to interact directly with the VMIG service, such as without having corresponding electronic communications pass over the public network 100, including in situations in which the VMIG service is implemented by a company (not shown) or other organization (not shown) or is otherwise affiliated with such a company or other organization, and in which the one or more users are employees of the company or otherwise members of the organization.

The functionality of the VMIG service 120 is implemented in the example embodiment of FIG. 1 by three VMIG modules 121, 124 and 127, although other modules may be included in other embodiments, and the modules 124 and/or 127 may not be provided in some embodiments. In particular, the functionality of the VMIG service may be implemented by one or more configured computing systems (not shown), such as by having those computing systems execute the modules 121, 124 and 127 to configure those computing systems to provide the functionality of the VMIG service. A customer or other user (referred to generally herein as a client of the VMIG service) may then use a client computing system or device 150 or 180 to interact with the VMIG service to configure generating processes to be performed for one or more VMIs to be manufactured for the client, as well as obtain access to such manufactured VMIs generated by the VMIG service. In this illustrated example, the VMIG service provides one or more interfaces 125 that such clients may use to interact with the VMIG service, such as one or more GUIs and/or one or more APIs.

For example, a particular client may specify configuration information for the VMIG service to use in generating a particular VMI for the client, with such specified information being stored with client configuration information 135 of the VMIG service. The configuration information specified by the client indicates construction components to use for the generating of the VMI, such as a base VMI to be modified (e.g., from one or more base VMIs 131 of the VMIG service), zero or more existing software programs to add to the base VMI (e.g., from one or more software programs 137 of the VMIG service), zero or more software code files or other groups of instructions to use to produce one or more software programs to add to the base VMI (e.g., stored as software code files 139 by the VMIG service), and zero or more configuration scripts to be executed in the base VMI to modify policies or other settings (e.g., from one or more configuration scripts 141 of the VMIG service). The indicated base VMI and any indicated existing software programs and/or configuration scripts may be supplied by the client to the VMIG service (e.g., uploaded to the VMIG service for storage until needed by the generating process; stored externally to the VMIG service in a network-accessible location, such as on one or more of computing systems 180, 150 and/or 140, or on one or more online storage services, not shown; etc.) and/or may be selected by the client from corresponding options provided by the VMIG service. Similarly, any indicated code files or other groups of instructions may be supplied by the client to the VMIG service, whether by being uploaded to the VMIG service or stored externally to the VMIG service in a network-accessible location. The configuration information specified by the client may further indicate one or more triggering conditions to cause the generating process for the VMI to be started, with corresponding information stored in client configuration information 135.

When the triggering conditions are satisfied or the VMIG service otherwise determines to initiate the generating process (e.g., based on a corresponding instruction that is currently or previously received from the client), the VMIG Construction module 121 may access the client configuration information 135 to determine the construction components and other configuration information to use for the generating process, and proceed to perform the generating process to generate a corresponding VMI 133 for the client, such as by using one or more hosted virtual machines of the VMIG service (not shown) or by using corresponding functionality of the VMI execution service 105. Additional details related to the generating process are included elsewhere herein, including with respect to the example of FIG. 2. In some embodiments, a determination that the triggering conditions are satisfied is made at least in part by the VMIG Monitoring module 124, such as by automated operations that it performs to obtain and analyze status information corresponding to the construction components for the generating process (e.g., to determine if any changes have occurred) or otherwise corresponding to the triggering conditions, in order to determine when the triggering conditions are satisfied. Such triggering conditions may have various forms in various embodiments, such as if-then rules, or more generally any form that allows one or more criteria to be specified that the VMIG service can evaluate.

After the VMI is generated for the client, the client may obtain access to the generated VMI in various manners. In some embodiments and situations, the VMIG Deployment module 127 may perform automated operations to deploy the generated VMI for the client by causing it to be executed on a virtual machine, such as on a hosted virtual machine of the VMIG service (not shown), by interacting with an image execution service such as VMI execution service 105 to have the image execution service perform the execution of the generated VMI, by supplying the generated VMI to a client computing system of the client that has a hosted virtual machine to execute the generated VMI (e.g., client computing systems 180 or 150), etc. In other embodiments, the generated VMI may be transferred from the VMIG service to a computing system 180 or 150 of the client for later use, such as for the VMIG service to initiate the transfer based on completion of the generating process, or for the VMIG service to perform the transfer when subsequently requested by the client.

The VMIG service may further provide subscription and/or registration services to clients, such that clients may specify account information (e.g., user name, billing information, etc.), accept terms of use, etc. In some embodiments, after a client interacts with the VMIG service to subscribe and/or register for services, the client may be issued one or more identifiers (e.g., keys, tokens, user names, etc.) that are associated with the client and are to be used in conjunction with generating virtual machine images on behalf of the client.

Thus, the generating process for such a VMI may be configured by a client to occur in various manners, with the VMIG service performing the generating process in the configured manner at an appropriate time.

In addition, at least some of the functionality of the VMI execution service is provided in this example by one or more system modules 110 of the VMI execution service 105. The modules 110 may, for example, assist particular customers in executing virtual machine images or other programs for the customers on virtual machine computing nodes 118 provided by the VMI execution service, with at least some such customers each having a group 170 of one or more virtual machine computing nodes or other types of computing nodes that are allocated, provisioned and configured to execute images for those customers. The VMI execution service may further be implemented by one or more configured computing systems (not shown), such as by those computing systems executing the system modules 110 to configure those computing systems to provide the functionality of the VMI execution service. While the VMI execution service makes various virtual machine computing nodes 118 available for executing virtual machine images of the customers in this example, in other embodiments at least some of the computing nodes used by the VMI execution service to execute customers' virtual machine images may be provided in other manners (e.g., made available by the customers and/or by third-parties, such as external computing systems 140, but managed by the VMI execution service).

In some embodiments, the illustrated virtual machine computing nodes 118 are each a virtual machine that is hosted on one or more physical computing systems (not shown) of the VMI execution service. Each of the computing nodes 118 has some amount of computing resources available for executing one or more virtual machine images, which provide a specific amount of execution capacity, such as may be measured, for example, by a quantity of one or more such computing nodes and/or by a combination of one or more of processing capacity (e.g., number and/or size of processing units), memory capacity, storage capacity, network bandwidth capacity, etc. The VMI execution service provider 105 may provide preconfigured computing nodes in some embodiments, with each preconfigured computing node having equivalent or otherwise similar amounts of resources available for executing virtual machine images on behalf of users, while the VMI execution service provider 105 may in other embodiments provide a selection of various different computing nodes from which a customer may choose for executing virtual machine images, such as with each selection having varying amounts and/or types of computing resources (e.g., size, speed and/or type of processing units; number of processing units; amount of memory and/or storage; platform configuration, such as 32-bit or 64-bit; etc.).

As discussed in greater detail elsewhere, the various customers may interact with the modules 110 to specify requests to initiate use of computing nodes for execution of virtual machine images on behalf of the customers, such as via one or more interfaces 115 provided by the VMI execution service for use by the customers (e.g., one or more GUIs and/or one or more APIs). The modules 110 may further provide subscription and/or registration services to customers, such that customers may specify information related to one or more virtual machine images to execute on behalf of a customer, account information (e.g., user name, billing information, etc.), terms of use, etc. In some embodiments, after a customer interacts with the modules 110 to subscribe and/or register for services, the customer may be issued one or more identifiers (e.g., keys, tokens, user names, etc.) that are associated with the customer and are to be used in conjunction with executing virtual machine images on behalf of the customer.

In some embodiments, a customer or other user may be charged various fees in association with use of the VMIG service, such as based on a number of times that a generating process is initiated, an amount of computing resources and/or time used in performing generating processes, an amount of storage used, etc. Similarly, a customer may be charged various fees in association with use of the VMI execution service, such as based on a number of computing nodes used, a type of computing nodes used, a duration of time the computing nodes are used, particular operations that the computing nodes perform (e.g., data transfer and/or storage), etc.

The network 100 may, for example, be a publicly accessible network of linked networks, possibly operated by various distinct parties, such as the Internet. In other embodiments, the network 100 may be a private network, such as, for example, a corporate or university network that is wholly or partially inaccessible to non-privileged users. In still other embodiments, the network 100 may include one or more private networks with access to and/or from the Internet. In addition, the modules 121, 124, 127 and/or 110 may each include software instructions that execute on one or more computing systems (not shown) by one or more processors (not shown), such as to configure those processors and computing systems to operate as specialized machines with respect to performing their programmed functionality. In addition, the modules and various computing nodes 118 may be provided in various manners, such as at a single data center or otherwise to use a group of co-located computing systems, or instead in a distributed manner using various computing systems in various distinct geographical locations.

Figure 2:
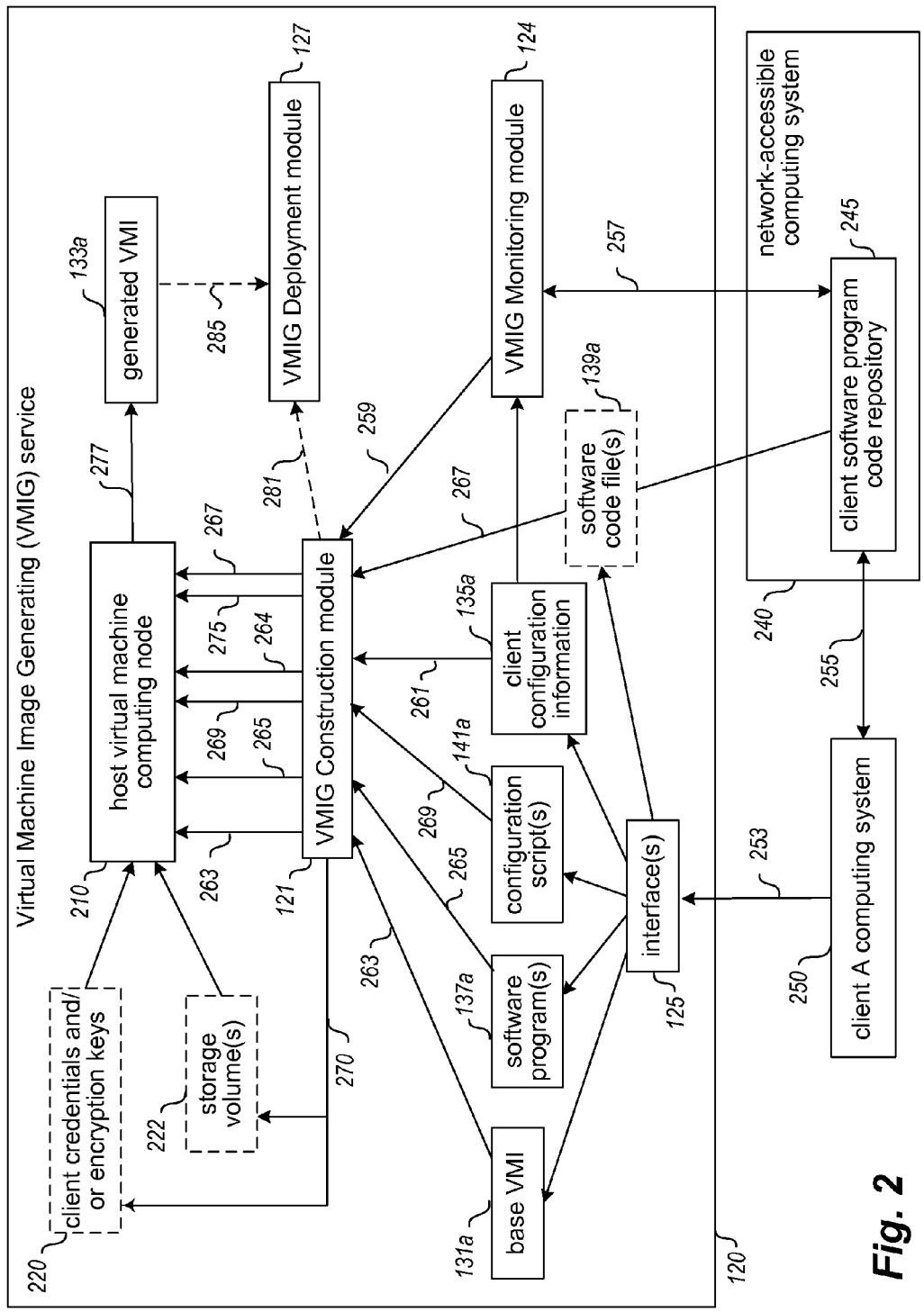
FIG. 2 illustrates an example of generating a virtual machine image in a configured manner.

FIG. 2 illustrates an example of generating a virtual machine image in a configured manner for a client. In particular, FIG. 2 includes some of the elements illustrated in FIG. 1 regarding VMIG service 120, as well as additional details. It will be appreciated that various of the details of FIG. 2 are included for illustrative purposes and are non-limiting, with other embodiments and situations not including such details.

In the example of FIG. 2, a particular client (referred to as "client A") is using a client computing system 250 to perform interactions 253 with one or more interfaces 125 of the VMIG service 120, such as by exchanging corresponding electronic communications over one or more networks (not shown). In particular, in this example, client A is configuring a generating process for a VMI to be generated for the client by the VMIG service, which in this example includes a software program under development by the client. As part of such software program development, client A performs additional electronic interaction 255 with a client software program code repository 245 stored on a network-accessible computing system 240 that is not part of the VMIG service, such as a computing system 240 at a location of the client or that is provided by another online service (e.g., an online storage service, online software development service, etc.).

As part of the interactions 253 with the VMIG service to configure the generating process, client A optionally specifies a base VMI 131a to use as a construction component in the generating process, such as by client A supplying the base VMI, selecting it from a plurality of VMIs available from the VMIG service, etc. In other embodiments, the VMIG service may instead select an appropriate VMI to use without the client indicating it, such as a default base VMI used by some or all clients of the VMIG service.

In addition, the interactions 253 further include client A optionally specifying one or more existing software programs 137a to use as construction components that are included in the VMI being generated, such as by client A supplying the software programs, selecting them from a plurality of existing software programs available from the VMIG service, etc. For example, such existing software programs may include commercially available application programs, various types of software development tools (e.g., for versioning, backtracking, audit logs, etc.), operating system modules or other extensions, etc.

The interactions 253 in this example further include client A optionally specifying one or more configuration scripts 141a to use as construction components that are part of the generating process, such as to be executed in the base VMI to configure policies (e.g., access and/or security policies) or to otherwise specify parameters or other settings in the executing base VMI. As with other construction components, any such configuration scripts may be supplied by client A and/or selected from a plurality of available configuration scripts provided by the VMIG service.

Interactions 253 may further include client A specifying various other configuration information 135a for the client, such as one or more triggering conditions to use to initiate the generating process, client login or credential or encryption information to use as part of generating the VMI and/or as part of interacting with one or more other online services (e.g., an image execution service, a computing system 240 with a code repository 245, etc.), one or more indicated times at which to initiate the generating process, etc. In other embodiments, the VMIG service may instead generate or determine some or all such information.

The interactions 253 by client A may further include providing information 139a about the location of the software code files or other groups of instruction and/or data to be used as part of producing the software program under development by the client, such as to enable the VMIG service to monitor and retrieve that information as appropriate.

In the illustrated embodiment, the generating process for client A uses triggering conditions that include when one or more of the software code files under development changes (e.g., is committed by client A to the code repository 245), such as by client A explicitly specifying those triggering conditions or instead relying on default triggering conditions of the VMIG service corresponding to monitoring for changes of some or all construction components that are specified for the generating process. In this example, the VMIG Monitoring module 124 obtains information from the client configuration information 135a as well as information 139a about the software code files, and uses the information to perform interactions 257 with the code repository 245 to monitor for changes to the specified software code files 139a.

Upon detecting changes to the software code files that cause the triggering conditions to be satisfied for the configured generating process, such as at a later time, the VMIG Monitoring module 124 further provides instructions 259 to the VMIG Construction module 121 to initiate the configured generating process for the VMI. In particular, the module 121 retrieves 261 the client configuration information 135a to determine the construction components and other configuration information to use. The module 121 then retrieves 263 the base VMI 131a and provides it to a host virtual machine computing node 210 to initiate the boot and execution of the base VMI. The module 121, which is executing on one or more computing systems (not shown) separate from the host virtual machine computing node 210, then performs one or more interactions 264 with the host virtual machine computing node to create a connection to the executing base VMI, including to login as the client if appropriate (e.g., by using client login information supplied with the client configuration information 135a).

The module 121 further performs interactions 270 to optionally generate or otherwise obtain client-specific data to use with the executing base VMI, such as client credentials and/or encryption keys 220. The interactions 270 may further, in some embodiments, include generating or otherwise accessing a storage volume 222 to attach to or otherwise include in the executing base VMI, such as may be provided by an online storage service (not shown). Such interactions may optionally further include configuring the storage volume for use within the base VMI in a particular manner (e.g., to create a file system of a specified type on the storage volume)—in other embodiments, such an external storage volume may not be used, such as if storage within the host virtual machine and executing base VMI is instead used.

After connecting to the executing base VMI and preparing the attached storage volume 222 and/or other storage of the base VMI, the module 121 performs further interactions 265 to retrieve any indicated existing software programs 137*a* and to install them in the executing base VMI. The module 121 similarly performs interactions 267 to retrieve the specified software code files 139*a* from the code repository 245 and to use the code files to produce one or more corresponding software programs (not shown), and installs such newly produced software programs in the executing base VMI. In some embodiments, such production of a software program may include compiling or otherwise processing the retrieved software code files, optionally, in a staging area (not shown) used by the VMIG service. The module 121 then further performs interactions 269 to retrieve any specified configuration scripts 141*a* and to cause them to be executed within the executing base VMI, such as to specify policies, to set indicated parameters or other settings, etc.

After the various steps of the generating process have been formed, the module 121 performs further interactions 275 with the host virtual machine computing node 210 to configure the VMI to be bootable and to optionally perform specified activities upon boot (e.g., to execute one or more of the installed software programs), and further causes the current state of the executing base VMI to be saved 277 as a new VMI 133*a* generated by the generating process.

In some embodiments, the module 121 may perform further activities to perform one or more validations tests on the generated VMI 133*a*, although such validation activities are not illustrated here. In addition, the module 121 may further perform one or more optional interactions 281 with the VMIG Deployment module 127 to cause the generated VMI 133*a* to be automatically deployed, such as to be executed on behalf of client A—if so, the module 127 may perform electronic interactions 285 to obtain a copy of the generated VMI 133*a* for such deployment, although additional activities specific to the deployment are not illustrated in this example.

In this manner, the VMIG service 120 may perform a configured generating process for client A to cause a new VMI 133*a* to be generated for the client, such as a single time or repeatedly (e.g., for each change of a specified type to the software code files in the code repository 245, on a periodic basis, etc.), with the generating process being triggered in this example based on activities of the client that include making changes to software code files for a software program being developed by the client. It will be appreciated that even if such triggering conditions are specified for client A's generating process, the generating process may be initiated in other manners in other situations, such as based on an explicit instruction initiated by client A. It will be further appreciated that client A may be an individual or may be a group of users (e.g., some or all of an organization), and that different users may be given different permissions to perform different activities (e.g., to interact with the VMIG service to obtain information about activities of the VMIG service that are performed for client A, but not to initiate the generating process, or vice versa).

While not illustrated in this example, one or more VMIs generated for client A may also be used for a specified purpose by client A, and if so, the deployment process may be configured to support such activities. As one example, the generated VMI(s) may be used to analyze or otherwise manipulate data provided by other users to client A (e.g., to manipulate other virtual machine images supplied to client A by customers of client A), and if so, the deployment activities may include installing the generated VMI(s) in a location that causes them to be used when such activities are needed, or to otherwise initiate their use by supplying such other data to be manipulated to the generated VMI(s) upon their execution and deployment.

In addition, in the example of FIG. 2, the VMI being generated is part of a software development process of the client A, and thus may be used as part of a development and/or test environment of client A in such situations. In other embodiments and situations, however, the VMIG service may be used in situations other than software development environments, such as to cause a new VMI to be generated when changes occur to construction components that are supplied by or under the control of entities other than the client (e.g., with respect to a base VMI, existing software programs, configuration scripts, etc.).

It will be appreciated that the example of FIG. 2 is included for exemplary purposes and is non-limiting, and that other types of software images, construction components, image generating operations, image validation operations and image deployment operations may be used in other embodiments.

Figure 3:
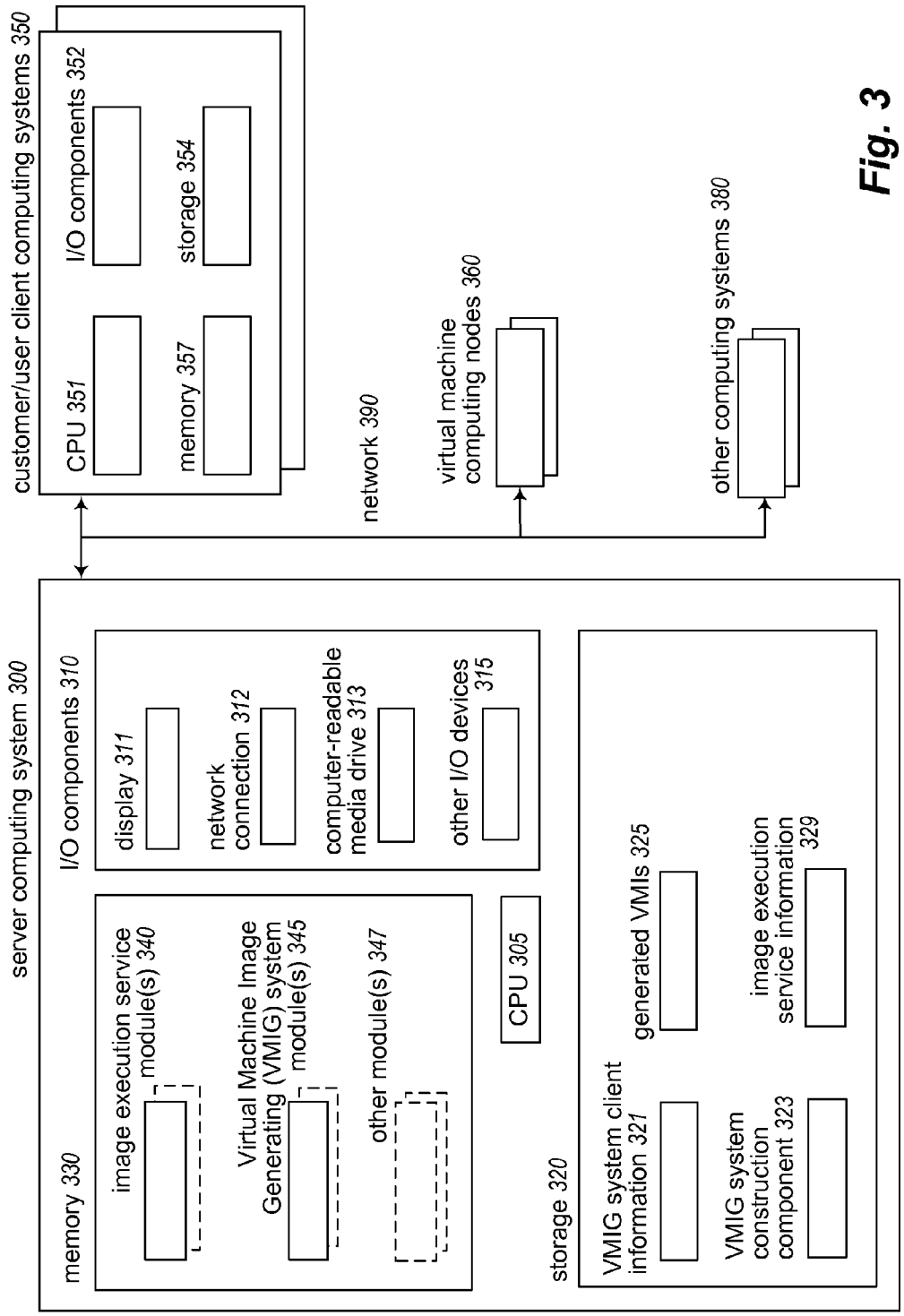
FIG. 3 is a block diagram illustrating example computing systems suitable for executing an embodiment of a system for generating virtual machine images in configured manners.

FIG. 3 is a block diagram illustrating example computing systems suitable for performing techniques for generating and using virtual machine images in configured manners. In particular, FIG. 3 illustrates a server computing system 300 suitable for providing at least some functionality of a Virtual Machine Image Generating (VMIG) system and of an image execution service, although in other embodiments multiple computing systems may be used for the execution (e.g., to have distinct computing systems executing the VMIG system and the image execution service), or functionality of the image execution service may not be provided. FIG. 3 also illustrates various client computing systems 350 that may be used by customers or other users of the VMIG system and/or the image execution service, virtual machine computing nodes 360 that may be used by the VMIG system and/or the image execution service, and optional other computing systems 380.

The server computing system 300 has components in the illustrated embodiment that include one or more hardware CPU ("central processing unit") computer processors 305, various I/O ("input/output") hardware components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated client computing systems 350 may each have components similar to those of server computing system 300, including one or more CPUs 351, I/O components 352, storage 354, and memory 357, although some details are not illustrated for the computing systems 350 for the sake of brevity. The other computing systems 380 and computing nodes 360 may also each include components that are similar to some or all of the components illustrated with respect to server computing system 300, but such components are not illustrated in this example for the sake of brevity.

One or more modules 345 of an embodiment of a VMIG system 345 are executing in memory 330, and in some embodiments each includes various software instructions that when executed program one or more of the CPU processors 305 to provide an embodiment of a VMIG service as described elsewhere herein. The module(s) 345 (e.g., corresponding to some or all of modules 121, 124 and 127 of FIGS. 1 and 2) interact with computing systems 350 and 380 and computing nodes 360 over the network 390 (e.g., via the Internet and/or the World Wide Web, via a private cellular network, etc.). In this example embodiment, the module(s) 345 include functionality related to generating VMIs in configured manners for customers or other users, and optionally further deploying for VMIs generated by the generating on behalf of the customers or other users, such as in conjunction with an image execution service provided by module(s) 340. The other computing systems 350 and 380 and computing nodes 360 may also be executing various software as part of interactions with the module(s) 340. For example, client computing systems 350 may be executing software in memory 357 to interact with module(s) 345 (e.g., as part of a Web browser, a specialized client-side application program, etc.), such as to interact with one or more interfaces (not shown) of the VMIG service to configure and control the generating of VMIs, as well as to perform various other types of actions, as discussed in greater detail elsewhere. Various information related to the functionality of the module(s) 345 may be stored in storage 320, such as information 321 related to clients of the VMIG service (e.g., account information, generating configuration information, etc., such as corresponding to configuration information 135 of FIGS. 1 and 2), information 323 related to construction components to use in the generating process (e.g., stored copies of construction components, stored information about external locations of construction components, etc., such as corresponding to information 131, 137, 139 and 141 of FIGS. 1 and 2), and information 325 related to VMIs that are generated by the VMIG service for clients (e.g., such as corresponding to VMIs 133 of FIGS. 1 and 2).

After the module(s) 345 receive requests (or other indications) to configure a generating process for a client, the module(s) 345 store corresponding information, and initiate activities to determine when to begin the generating process (e.g., immediately; at a scheduled time; when triggering conditions are satisfied; etc.), including in some embodiments and situations to begin monitoring for satisfaction of specified triggering conditions. When a determination is made to initiate generation of a VMI using such a generating process, the modules further obtain the construction components and any other configuration information needed, and use at least one hosted virtual machine (e.g., one of the computing nodes 360) to perform the generating process and to generate a corresponding VMI 325. The computing nodes 360 may have various forms in various embodiments, such as to include a number of hosted virtual machines executing on one or more physical computing systems. In some embodiments, the server computing system 300 and computing nodes 360 may be part of a data center or other group of co-located computing systems, or may otherwise be computing nodes of a private network. In addition, in some embodiments, the module(s) 345 may interact with one or more other computing systems 380, such as to obtain construction components and/or to monitor for satisfaction of triggering conditions. In some embodiments, the module(s) 345 may further interact with image execution service modules 340, such as to deploy a generated VMI on behalf of a client.

One or more modules 340 of an embodiment of an image execution service (e.g., corresponding to modules 110 of FIG. 1) are also executing in memory 330 in this example embodiment, and in some embodiments each includes various software instructions that when executed program one or more of the CPU processors 305 to provide the described functionality for the image execution service, such as to execute virtual machine images and/or other software images for customers. The module(s) 345 in this example interact with the image execution service provided by the module(s) 340 via the server computing system 300 (e.g., via shared memory, an internal bus, etc.), although in other embodiments the VMIG system and image execution service may instead interact via one or more intervening computer networks. Various information related to the functionality of the modules 340 may also be stored in storage 320, such as information 329 related to customers of the image execution service and/or executable images to be executed. In addition, one or more other modules 347 may also optionally be executing in memory 330 to provide other functionality.

It will be appreciated that computing systems 300, 350 and 380 and computing nodes 360 are merely illustrative and are not intended to limit the scope of the present invention. The computing systems and/or nodes may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system or device may comprise any combination of hardware that may interact and perform the described types of functionality, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated modules 340 and/or 345 may in some embodiments be distributed in additional modules. Similarly, in some embodiments some of the functionality of the modules 340 and/or 345 may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the module(s) 340 and/or the module(s) 345) and/or data structures, such as by execution of software instructions of the one or more software programs and/or by storage of such software instructions and/or data structures. Furthermore, in some embodiments, some or all of the systems and/or modules may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, modules and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
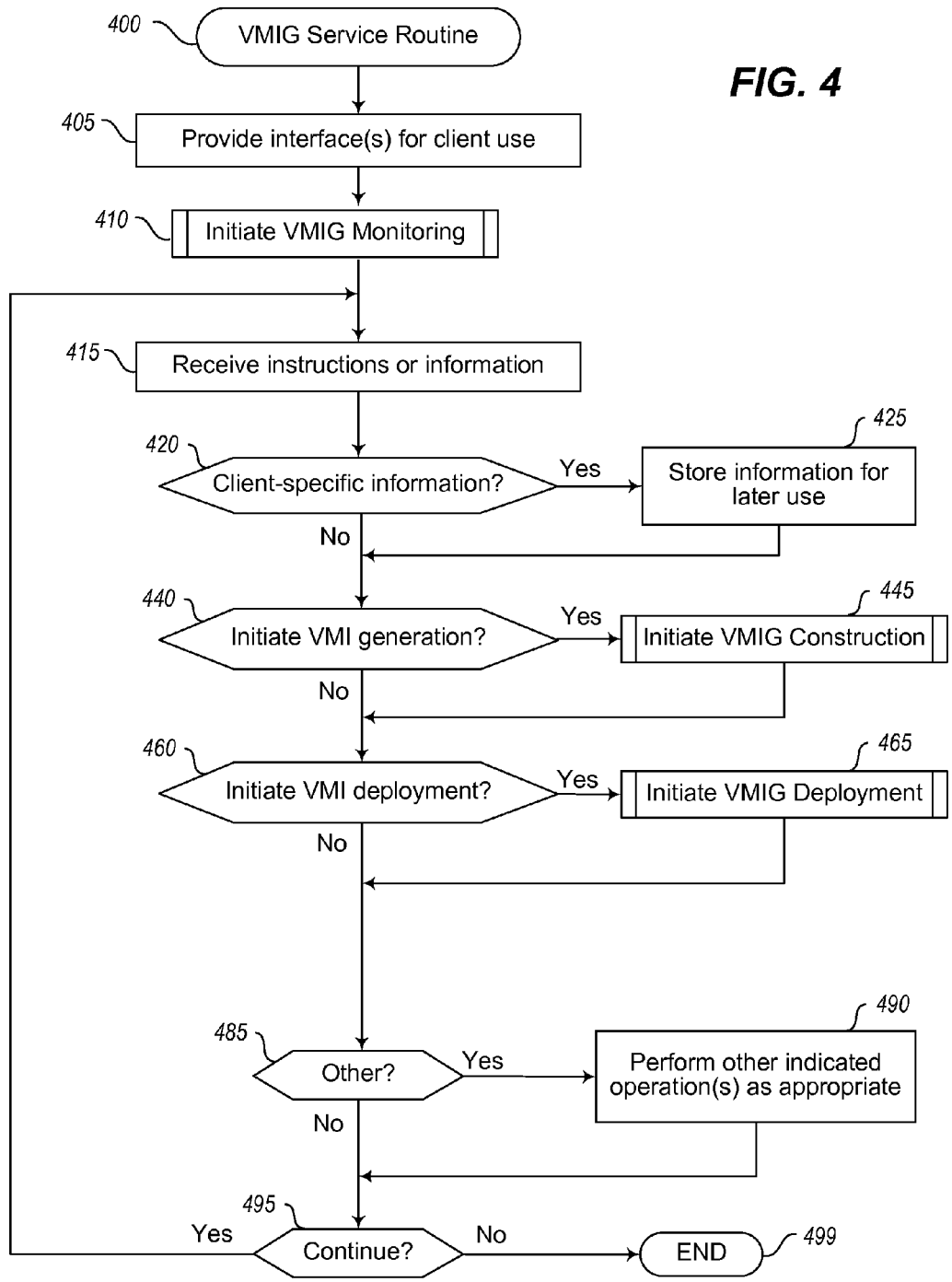
FIG. 4 illustrates a flow diagram of an example embodiment of a Virtual Machine Image Generating (VMIG) Service routine.

FIG. 4 is a flow diagram of an example embodiment of a VMIG Service routine 400. The routine may, for example, be provided by execution of the VMIG service 120 of FIGS. 1 and 2 and/or by the VMIG modules 345 of FIG. 3, such as to provide functionality for customers or other users to configure generating processes for VMIs to be generated. While the illustrated embodiment of the routine 400 discusses generating and using virtual machines images, it will be appreciated that similar techniques may be used in other embodiments to manufacture and use other types of executable software images. In addition, while the illustrated embodiment of the routine 400 discusses performing operations for a single VMI at a time, it will be appreciated that in other embodiments some or all of the operations of the routine 400 may instead be applied to a group of multiple related VMIs at a single time.

The illustrated embodiment of the routine 400 begins at block 405, where the VMIG service provides one or more interfaces for use by clients—as discussed in greater detail elsewhere herein, such interfaces may include one or more GUIs and/or one or more APIs. In block 410, the routine then initiates operation of a VMIG Monitoring routine to monitor for satisfaction of specified triggering conditions (including to initiate execution of the VMIG Monitoring routine if needed), and with one example of such a VMIG Monitoring routine being discussed in greater detail with respect to FIG. 7. In the illustrated embodiment, the performance of block 410 is performed in an asynchronous manner with respect to other operations of routine 400, such that the routine 400 continues operating while the VMIG Monitoring routine is independently executing, although startup and/or ongoing performance of such routines may be coordinated in other manners in other embodiments.

After block 410, the illustrated embodiment of the routine 400 continues to block 415 to receive instructions or information, such as to wait until such instructions or information are received. After receiving such instructions or information in block 415, the routine continues to block 420 to determine whether the instructions or information received in block 415 are client-specific information supplied by a client, such as during initial registration or later interactions with the VMIG service (e.g., information about an account of the client with the VMIG service, about a new or changed configured generating process for a VMI to be generated, etc.). If so, the routine continues to block 425 to store the information for later use. In addition, when the information includes new or changed triggering conditions, or other changes related to operations of the VMIG Monitoring routine (e.g., a suspension or resumption of monitoring for a particular configured generating process), a corresponding update is provided to the VMIG Monitoring routine, although in other embodiments the VMIG Monitoring routine may instead identify such new or changed information when it next access the stored information.

After block 425, or if it was instead determined in block 420 that the instructions or information received in block 415 were not client-specific information, the routine continues to block 440 to determine if the instructions or information received in block 415 include information to cause generation of a VMI to be initiated, such as an instruction from a client or other VMIG module to begin a configured generating process for generating such a VMI. If so, the routine continues to block 445 to initiate performance of such VMI generation by the VMIG Construction routine (including to initiate execution of the VMIG Construction routine if needed), such as by providing information about the VMI to be generated, and with one example of such a VMIG Construction routine being described in greater detail with respect to FIGS. 5A-5C. As with the VMIG Monitoring routine, the execution of the VMIG Construction routine may be performed in an asynchronous or synchronous manner in various embodiments with respect to operation of the routine 400.

After block 445, or if it was instead determined in block 440 that the instructions or information received in block 415 were not to initiate VMI generation, the routine continues instead to block 460 to determine if the instructions or other information received in block 415 relate to initiating the deployment of a generated VMI, such as for a VMI that was just generated in block 445 (e.g., if the execution of the VMIG Construction routine is performed synchronously) or for another indicated VMI. If so, the routine 400 continues to block 465 to initiate performance of such deployment by the VMIG Deployment routine (including to initiate execution of the VMIG Deployment routine if needed), such as by providing information about the VMI to be deployed, and with one example of such a routine being described in greater detail with respect to FIG. 6. As with the VMIG Monitoring and VMIG Construction routines, the execution of the VMIG Deployment routine may be performed in an asynchronous or synchronous manner in various embodiments with respect to operation of the routine 400.

After block 465, or if it is instead determined in block 460 that the instructions or information received in block 415 are not to initiate deployment of the generated VMI, the routine continues to block 485 to determine if instructions or information received in block 415 are of another type not addressed with respect to blocks 420, 440, or 460. If so, the routine continues to block 490 to perform one or more other indicated operations as appropriate. For example, an external entity may provide information to the VMIG service that includes status information possibly related to one or more triggering conditions (e.g., with respect to an external location in which one or more construction components for one or more configured generating processes are stored), and if so the routine may receive and store such information in block 490, or otherwise make such information available to the VMIG Monitoring routine. In addition, the routine may perform other activities with respect to clients in block 490 (e.g., other registration activities, obtaining payment for fee-based functionality provided by the VMIG service, etc.), as well as performing periodic housekeeping operations.

After block 490, or if the routine instead determines in block 485 that the instructions or information received in block 415 are not of another type, the routine continues to block 495 to determine whether to continue, such as until an explicit indication to terminate is received. If it is determined to continue, the routine returns to block 415, and otherwise continues to block 499 and ends.

Figure 5A:
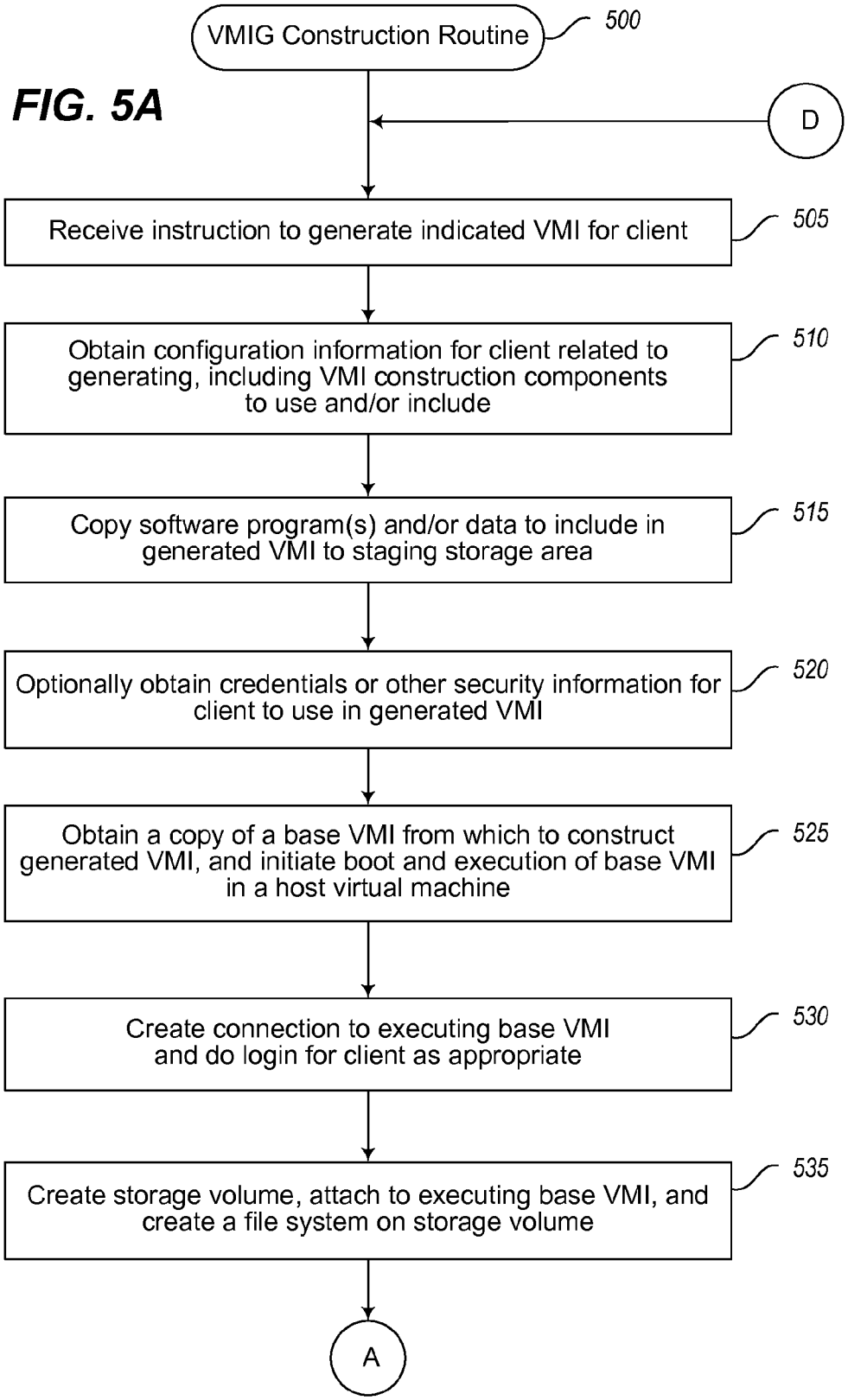
Figure 5C:
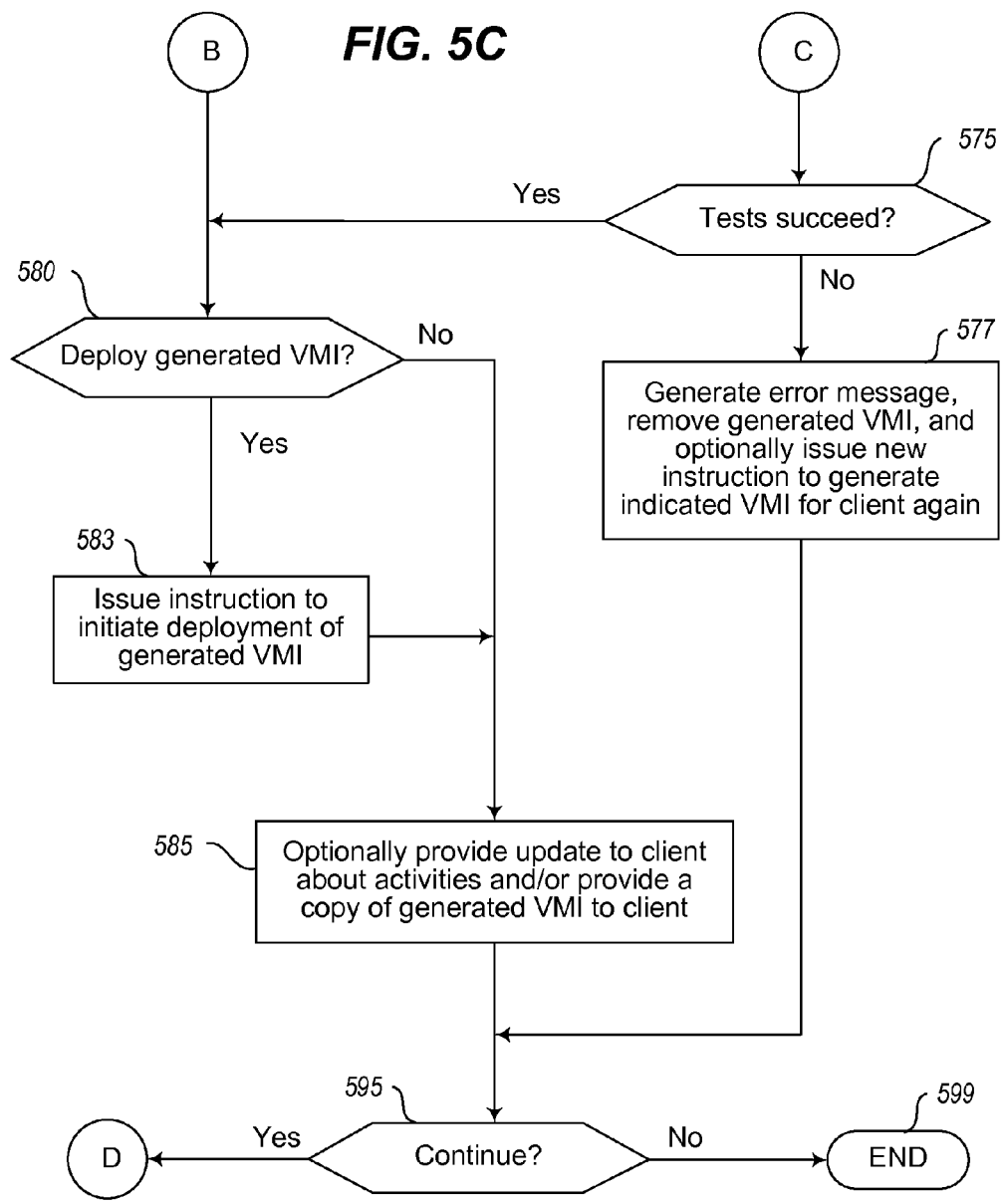

FIGS. 5A-5C are a flow diagram of an example embodiment of a VMIG Construction routine 500. The routine may, for example, be provided by execution of the VMIG Construction module 121 of FIGS. 1 and 2 and/or by one of the modules 345 of FIG. 3, such as to perform a configured generating process to generate an indicated VMI for a client. The routine 500 may be initiated in various manners, including with respect to block 445 of FIG. 4, and based on instructions received from a client or from the VMIG service (e.g., from the VMIG Monitoring routine).

The illustrated embodiment of the routine 500 begins in block 505, where an instruction is received to generate an indicated VMI for a client. In block 510, the routine continues to obtain configuration information for the client related to the generating process for the indicated VMI, including to identify VMI construction components to use and/or include in the VMI being generated. The routine at block 515 then copies software programs and/or data to include in the generated VMI to a staging storage area for easier access and manipulation, although in other embodiments such a staging area may not be used, such as if a software program under development by the client is not being compiled or otherwise produced from underlying code files and other groups of instructions and data.

After block 515, the routine continues to block 520 to optionally obtain credentials or other security information for the client to use for the VMI being generated, including to, in some embodiments, obtain part or all of an encryption key pair to use to protect some or all of the software or data stored on the VMI being generated, and to obtain client login information to use during the generating process. After block 520, the routine in block 525 obtains a copy of a base VMI on which to base the VMI being generated, and initiates the boot and execution of the base VMI in a host virtual machine. In block 530, the routine then creates a connection to the executing base VMI from another computing system that is orchestrating the generating process, including to do a login for the client if appropriate using client-specified login information.

After block 530, the routine in block 535 creates a storage volume, attaches it to the executing base VMI, and creates a file system on the storage volume, although in other embodiments such an external storage volume may not be used, such as if storage within the base VMI and host virtual machine is instead used without attaching a separate storage volume. In block 545, the routine then installs the software programs (e.g., from the staging storage area or other accessible location) to the executing base VMI, using the obtained security information (if any) to access and protect the software programs and data if needed, including to encrypt some or all of the saved programs and data using an encryption key of the key pair to prevent them from unauthorized access. In some embodiments, some or all of the software programs to be installed may be under development by the client, such that code files or other data used to produce the software programs are stored in the staging area and are compiled or otherwise combined to produce one or more such software programs that are then installed on the base VMI. In other embodiments in which some or all of the software programs to be installed are under development by the client, some or all such activities to produce those software programs from corresponding underlying code are instead performed on the base VMI itself. After block 545, the routine continues to block 550 to obtain one or more configuration scripts (if any) to use in further customizing the generated base VMI for the client, and executes those scripts in the executing VMI, such as to set security and/or access policies on the base VMI or to otherwise specify settings or parameters in the base VMI as appropriate. After block 550, the routine continues to block 555 to store a decryption key or other security credential (if any) in the executing base VMI for later use during subsequent execution of the generated VMI.

In blocks 560 and 565, the routine then continues to save a current state of the executing base VMI as the new VMI being generated, including to store the generated VMI for later use, and with the generated VMI being configured in at least some embodiments and situations to be bootable and to execute one or more of the installed software programs on boot or other startup.

After block 565, the routine continues to block 570 to determine whether to perform one or more validation tests on the generated VMI, such as based on configuration specified by the client and/or a type of VMI being generated. If so, the routine continues to block 573 to initiate the boot and execution of the generated VMI on a host virtual machine (e.g., a different host virtual machine from that used for the initial generation of the VMI), including to verify that the startup activities complete successfully, including that any installed software programs configured to execute on boot do so correctly. The routine may optionally further perform other specified validation tests, such as by executing a script supplied by the client to test particular settings or functionality of the generated VMI. After block 573, the routine continues to block 575 to determine if the validation tests succeeded, and if not continues to block 577 to perform corresponding activities, such as to generate an error message, to remove the generated VMI, and optionally to issue a new instruction to re-generate the indicated VMI for the client again.

If it is instead determined in block 575 that the validation tests do succeed, or in block 570 not to test the generated VMI, the routine continues instead to block 580 to determine whether to deploy the VMI that was just generated, such as based on configuration information previously supplied by the client, instructions received in block 505 as part of initiating the generating process for the VMI, etc. If so, the routine continues to block 583 to issue an instruction to cause the deployment of the generated VMI to be initiated by the VMIG Deployment routine, such as in a manner previously configured by the client. After block 583, or if it is instead determined in block 580 that the generated VMI is not to be deployed at the correct time, the routine continues to block 585 to optionally provide an update to the client about the activities performed by the routine 500 (e.g., to confirm success in the VMI generation and/or deployment), including to optionally provide a copy of the generated VMI to the client or otherwise make the VMI accessible if not immediately deployed. In addition, in some embodiments and situations, a client may not have access to information about the process of the VMIG service generating a VMI for the client until the process is completed, such as until a copy of the generated VMI is provided to the client in block 585 or the generated VMI is otherwise deployed in block 583. In other embodiments and situations, a client may instead be able to view and/or modify the VMI being generated at one or more points in the process, such as during the generation process with respect to one or more of blocks 525, 530, 535, 545, 550, 555, 560 and 565, and/or during the validation process with respect to block 573. In the latter situation, at least some of the generation and/or validation may be performed using client credentials or other access information, such as to enable the client to access one or more host virtual machines used during the generation and/or validation processing (e.g., host virtual machines provided by an affiliated image execution service, host virtual machines used by the VMIG service, etc.)—in the former situation, at least some of the generation and/or validation may be performed using credentials or other access information of the VMIG service itself that are not available to the client, or such client access may otherwise be blocked.

After blocks 577 or 585, the routine continues to block 595 to determine whether to continue, such as until an explicit indication to terminate is received. If it is determined to continue, the routine returns to block 505, and otherwise continues to block 599 and ends.

Figure 6:
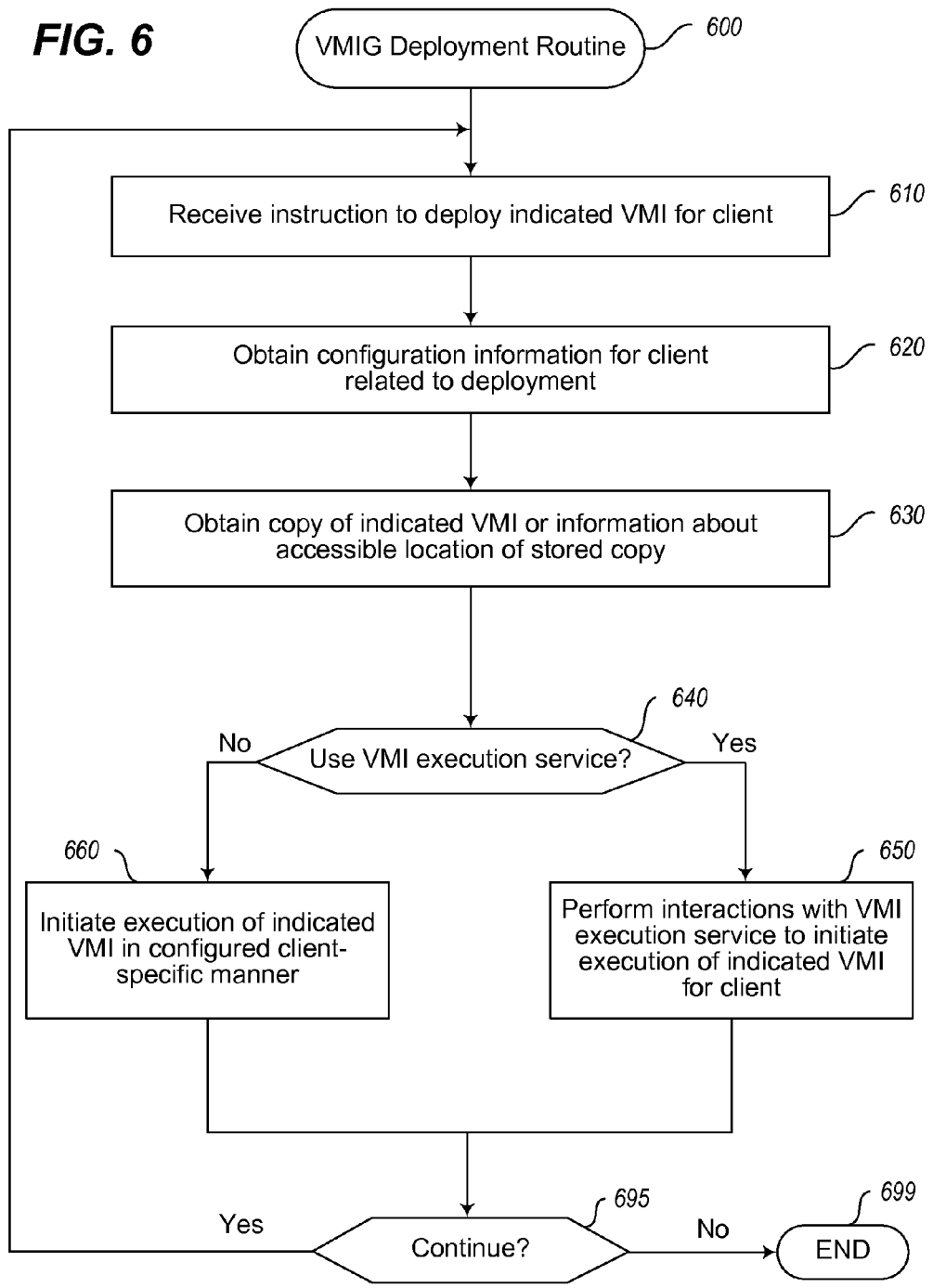
FIG. 6 illustrates a flow diagram of an example embodiment of a VMIG Deployment routine.

FIG. 6 is a flow diagram of an example embodiment of a VMIG Deployment routine 600. The routine may, for example, be provided by execution of the VMIG Deployment module 127 of FIGS. 1 and 2 and/or by one of the modules 345 of FIG. 3, such as to execute or otherwise deploy a VMI that has been generated by the VMIG service on behalf of the client for which the VMI was generated. The routine 600 may be invoked in various manners in various embodiments, including with respect to block 465 of FIG. 4, and based on instructions received from a client or from the VMIG service (e.g., from the VMIG Construction routine).

The illustrated embodiment of the routine 600 begins in block 610, where an instruction to deploy an indicated VMI for a client is received. In block 620, the routine then obtains configuration information for the client related to the deployment, such as instructions on where to execute the VMI (e.g., by an indicated image execution service) and corresponding information to use in doing so (e.g., client login or other information of the client for the image execution service). In other embodiments, the deployment activities may include moving a copy of the generated VMI to an indicated storage location external to the VMIG service, whether in addition to or instead of executing the generated VMI.

In block 630, the routine then obtains a copy of the indicated VMI or information about an accessible location of a stored copy for use in the deployment activities. After block 630, the routine continues to block 640 to determine whether the deployment activities include using a VMI execution service to execute the VMI. If so, the routine continues to 650 to perform interactions with the VMI execution service to initiate execution of the indicated VMI for the client, such as by providing the VMI execution with a copy of the VMI or information from block 630 about an accessible location of the VMI, as well as information about the client on whose behalf the VMI is being executed. In other embodiments, the VMIG service may identify itself to the VMI execution service as its customer, while tracking internally the client for which its interactions with the VMI execution service are performed. If it is instead determined in block 640 to not use the VMI execution service, the routine instead continues to block 660 to initiate execution of the indicated VMI in another configured client-specific manner, such as to initiate execution on a hosted virtual machine under the control of the client, by using a host virtual machine provided by the VMIG service, etc. While not illustrated here, the VMIG service may in some embodiments and situations perform further activities with respect to the execution that is initiated in blocks 650 and/or 660, such as to monitor the initial execution to confirm that it succeeds and to provide corresponding information to the client (e.g., to indicate successful execution, to indicate a problem with execution, etc.), to monitor ongoing execution and to provide corresponding information to the client, etc. In other embodiments and situations, the VMI execution service may perform such activities or otherwise provide status information to clients for execution that occurs with respect to block 650, and/or the client may be responsible for performing such activities on their own for execution that is initiated in block 660 (e.g., on computer hardware owned or otherwise controlled by the client).

After blocks 650 or 660, the routine continues to block 695 to determine whether to continue, such as until an explicit indication to terminate is received. If it is determined to continue, the routine returns to block 610, and otherwise continues to block 699 and ends.

FIG. 7 is a flow diagram of an example embodiment of a VMIG Monitoring routine 700. The routine may, for example, be provided by execution of the VMIG Monitoring module 124 of FIGS. 1 and 2 and/or by one of the modules 345 of FIG. 3, such as to monitor when triggering conditions for one or more configured VMI generating processes are satisfied. The routine may be initiated in various manners in various embodiments, including with respect to block 410 of FIG. 4.

The illustrated embodiment of the routine 700 begins at block 705, where information is retrieved about specified VMI construction components and triggering conditions to monitor, such as for current clients of the VMIG service. In addition, the routine sets an initial timer for periodically gathering status information to monitor for those construction components or other triggering conditions, and then continues to block 710 to wait for the timer to expire or to instead receive information or instructions (with the timer optionally being set to zero on its first use to cause immediate performance of such operations).

After block 710, the routine continues to block 715 to determine whether instructions related to monitoring have been received in block 710, and if so, continues to block 720 to update the monitoring activities being performed accordingly. For example, in some embodiments a client may specify to temporarily suspend or resume use of a particular configured generating process, and if so, such instructions may be implemented accordingly.

If it is instead determined in block 715 that information or instructions received in block 710 are not related to performing monitoring, the routine continues instead to block 730 to determine if the timer has expired, thus indicating to gather new status information to use for the monitoring. If so, the routine continues to block 735 to gather status information for the VMI construction components and triggering conditions whose information was retrieved in block 705 and optionally updated in blocks 720 and/or 755, and updates the stored status information accordingly. It will be appreciated that the gathering of status information may include a number of interactions performed over a period of time, whether in an incremental manner or not. In addition, and as discussed in greater detail elsewhere, the gathering of status information may be performed in various manners in various embodiments, including for the routine 700 to retrieve status information about any modifications of construction components or to otherwise retrieve other related information, and/or for other external entities (an external code repository, online storage service, etc.) to push status information to the routine about construction components under control of the other entity (e.g., in response to prior requests by the VMIG Monitoring routine for such information).

If it is instead determined in block 730 that the timer did not expire and that other information was thus received in block 710, the routine continues instead to block 755 to store that received information for later use. As noted elsewhere, such information may include, for example, status information pushed to the VMIG service from an external entity, new or changed configuration information related to a VMI generating process (e.g., from a new or existing client of the VMIG service), etc. After block 755, the routine continues to block 765 to determine if the new information that was received included any status information corresponding to monitoring of triggering conditions. If so, or after blocks 720 or 735, the routine continues to block 745 to analyze the stored status information to determine if any specified triggering conditions for any configured VMI generating processes are satisfied, and to initiate corresponding generating process activities to generate any such VMIs when such triggering conditions are satisfied. As discussed in greater detail elsewhere, such triggering conditions and satisfaction determination may be performed in various manners in various embodiments, including based on changes to one or more construction components for a particular configured VMI generating process.

After block 745, or if it is instead determined in block 765 that the received information was not status information, the routine continues to block 795 to determine whether to continue, such as until an explicit indication to terminate is received. If it is determined to continue, the routine continues to block 785 to optionally reset the timer (e.g., if status information was gathered in block 735) and then returns to block 710, and otherwise continues to block 799 and ends.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, synchronously or asynchronously, etc.) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A computer-implemented method comprising:
receiving, by one or more computing systems of a virtual machine image generating service, configuration information from a client that specifies one or more triggering conditions for use in determining when to generate a new target virtual machine image constructed from multiple stored construction components based at least in part on changes in the stored multiple construction components;
monitoring, by the one or more computing systems, status information indicating changes to one or more of the multiple stored construction components;
determining, by the one or more computing systems and based on the monitoring, that the one or more triggering conditions are satisfied;
performing, by the one or more computing systems and based on the determining that the one or more triggering conditions are satisfied, the generating of the new target virtual machine image by:
    executing a base virtual machine image in a host virtual machine;
    modifying the host virtual machine based at least in part on the changes to the one or more stored construction components of the multiple stored construction components, the modifying including adding data specific to the client to storage of the host virtual machine, installing one or more software programs on the host virtual machine, and configuring one or more policies on the host virtual machine, wherein the installed software programs include at least one of the multiple stored construction components; and
    saving, after the modifying of the host virtual machine, a current state of the modified host virtual machine as the new target virtual machine image, wherein the new target virtual machine image is configured to execute at least one of the installed software programs upon boot; and
providing, by the one or more computing systems and to the client, access to the generated new target virtual machine image.

2. The computer-implemented method of claim 1 wherein the performing of the generating of the new target virtual machine image further includes, after the saving of the current state as the new target virtual machine image, validating the new target virtual machine image by performing the one or more validation tests, the performing of the validation tests including initiating execution of the new target virtual machine image and determining that the at least one installed software program executes successfully.

3. The computer-implemented method of claim 2 wherein the receiving of the configuration information further includes receiving information from the client that specifies at least one of the validation tests to perform for the new target virtual machine image.

4. The computer-implemented method of claim 1 wherein the providing of the access to the generated new target virtual machine image further includes deploying, by the one or more computing systems, an executing copy of the generated new target virtual machine image on behalf of the client.

5. The computer-implemented method of claim 4 wherein the deploying of the executing copy of the generated new target virtual machine image includes performing, by the virtual machine image generating service, one or more electronic interactions over one or more computer networks with an online execution service to initiate execution of the generated new target virtual machine image by the online execution service on behalf of the client.

6. The computer-implemented method of claim 1 wherein the at least one stored construction component of the installed software programs includes a first software program created by the client, and wherein the one or more triggering conditions include a change to one or more files used to produce the first software program.

7. The computer-implemented method of claim 1 wherein the at least one stored construction component of the installed software programs includes a first software program selected by the client from a plurality of available defined software programs, and wherein the one or more triggering conditions include a change to the first software program.

8. The computer-implemented method of claim 1 wherein the base virtual machine image is one of the multiple stored construction components and is supplied by the client or selected by the client from a plurality of available base virtual machine images, and wherein the one or more triggering conditions include a change to the base virtual machine image.

9. The computer-implemented method of claim 1 wherein the multiple stored construction components include a configuration script that is executed to perform at least some of the configuring of the one or more policies and is supplied by the client or selected by the client from a plurality of available configuration scripts, and wherein the one or more triggering conditions include a change to the configuration script.

10. The computer-implemented method of claim 1 wherein the received configuration information includes one or more build files that specify the multiple stored construction components and that specify a plurality of actions to occur as part of the performing of the generating of the new target virtual machine image, and wherein the one or more triggering conditions include a change to at least one of the one or more build files.

11. The computer-implemented method of claim 1 wherein the performing of the generating of the new target virtual machine image includes obtaining security-related information specific to the client that includes at least one of a credential for the client or one or more keys for use in encryption or decryption, and wherein the data specific to the client that is added to the storage of the host virtual machine includes the obtained security-related information specific to the client.

12. The computer-implemented method of claim 1 wherein the virtual machine image generating service is an online service accessible to a plurality of customers over one or more computer networks, wherein the virtual machine image generating service provides one or more interfaces for use by the plurality of customers, and wherein the client is one of the plurality of customers and provides the configuration information via one or more electronic interactions over the one or more computer networks with at least one of the provided interfaces.

13. The computer-implemented method of claim 1 wherein the virtual machine image generating service is deployed by an organization for internal use, and wherein the client is one of the members of the organization.

14. A non-transitory computer-readable medium having stored contents that cause a computing system of a virtual machine image generating service to at least:
receive configuration information from a client that specifies one or more triggering conditions for use in determining when to generate a target virtual machine image constructed from multiple stored construction components based at least in part on changes in the multiple stored construction components;
based at least in part on monitoring status information that indicates one or more modifications made to at least one of the multiple stored construction components, determine that the one or more triggering conditions are satisfied and perform the generating of the target virtual machine image by:
executing a base virtual machine image in a host virtual machine;
modifying the host virtual machine based at least in part on the one or more modifications made to the at least one stored construction component, wherein the modifying of the host virtual machine includes installing one or more software programs on the host virtual machine, adding data specific to the client to storage of the host virtual machine, and configuring one or more settings on the host virtual machine using one or more of the multiple stored construction components, wherein one of the installed software programs is one of the multiple stored construction components; and
saving, after the modifying of the host virtual machine, a current state of the host virtual machine as the target virtual machine image, wherein the target virtual machine image is configured to execute at least one of the installed software programs upon startup; and
provide access for the client to the generated target virtual machine image.

15. The non-transitory computer-readable medium of claim 14 wherein the client is one of a plurality of clients of the virtual machine image generating service, and wherein the stored contents include software instructions that, when executed, further cause the computing system to:
provide one or more interfaces of the virtual machine image generating service for use by the plurality of clients; and
receive, via one of the provided interfaces and based on one or more electronic communications sent over one or more computer networks from a client device of the client, instructions from the client to cause the generating of the target virtual machine image to be initiated, and wherein the performing of the generating of the target virtual machine image is based at least in part on the received instructions.

16. The non-transitory computer-readable medium of claim 15 wherein the instructions are received as part of the receiving of the configuration information and include an indication to perform the generating of the target virtual machine image at an indicated time.

17. A system, comprising:
one or more processors of one or more computing systems; and
one or more memories including stored instructions that, when executed by at least one of the one or more processors, cause the at least one processor to provide a software image generating service, the providing including:
receiving configuration information from a client that specifies one or more triggering conditions for use in determining when to generate a target software image to be constructed from multiple stored construction components;
monitoring one or more of the multiple stored construction components, and determining, based at least in part on a change to at least one of the multiple stored construction components identified from the monitoring, that the one or more triggering conditions are satisfied;
based at least in part on the determining, generating the target software image by:
executing a base software image in a host machine;
modifying the host machine based at least in part on the change to the at least one of the multiple stored construction components, the modifying of the host machine including modifying storage of the host machine to include data specific to the client, configuring one or more settings on the host machine based at least in part on one or more of the multiple stored construction components, and installing one or more software programs on the host machine, wherein at least one of the installed software programs is one of the multiple construction components; and
saving, after the modifying of the host machine, a current state of the host machine as the target software image, wherein the target software image is configured to execute at least one of the installed software programs upon startup; and
providing access for the client to the generated target software image.

18. The system of claim 17 wherein the stored instructions include software instructions that further cause the at least one processor to provide one or more interfaces of the software image generating service for use by a plurality of clients of the software image generating service that includes the client from whom the configuration information is received, and wherein the receiving of the configuration information from the client occurs via one of the provided interfaces and is based on one or more electronic communications sent over one or more computer networks from a client device of the client.

19. The system of claim 18 wherein the target software image is a virtual machine image, wherein the base software image is a base virtual machine image, and wherein the host machine is a virtual machine on which the base virtual machine image is loaded before the modifying of the virtual machine.

* * * * *